United States Patent [19]

Cocanougher et al.

[11] Patent Number: 4,999,802

[45] Date of Patent: Mar. 12, 1991

[54] FLOATING POINT ARITHMETIC TWO CYCLE DATA FLOW

[75] Inventors: Daniel Cocanougher, Fort Worth; Robert K. Montoye; Myhong Nguyenphu, both of Austin; Stephen L. Runyon, Pflugerville, all of Tex.

[73] Assignee: International Business Machines Corporation, Armonk, N.Y.

[21] Appl. No.: 297,781

[22] Filed: Jan. 13, 1989

[51] Int. Cl.⁵ .................................................. G06F 7/38
[52] U.S. Cl. ..................................... 364/748; 364/745
[58] Field of Search ............................... 364/748, 745

[56] References Cited

U.S. PATENT DOCUMENTS

| | | | |
|---|---|---|---|
| 3,131,293 | 4/1964 | Bush et al. | |
| 3,508,038 | 4/1970 | Goldschmidt et al. | |
| 3,551,665 | 12/1970 | Powers et al. | |
| 3,697,734 | 10/1972 | Booth et al. | 235/164 |
| 3,787,673 | 1/1974 | Watson et al. | |
| 4,075,704 | 2/1978 | O'Leary | 364/748 |
| 4,179,734 | 12/1979 | O'Leary | 364/200 |
| 4,295,203 | 10/1981 | Joyce | 364/748 |
| 4,390,961 | 6/1983 | Negi et al. | 364/756 |
| 4,484,300 | 11/1984 | Negi et al. | 364/755 |
| 4,525,796 | 6/1985 | Omoda et al. | 364/730 |
| 4,589,067 | 5/1986 | Porter | 364/200 |
| 4,598,359 | 7/1986 | Boothroyd et al. | 364/200 |
| 4,639,886 | 1/1987 | Hashimoto et al. | 364/736 |
| 4,683,547 | 7/1987 | DeGroot | 364/748 |
| 4,719,589 | 1/1988 | Tanaka | 364/748 |
| 4,766,564 | 8/1988 | DeGroot | 364/748 |
| 4,779,220 | 10/1988 | Nukiyama | 364/748 |
| 4,799,182 | 1/1989 | Marwood | 364/748 |
| 4,825,400 | 4/1989 | Simoncic et al. | 364/748 |
| 4,841,467 | 6/1989 | Ho et al. | 364/748 |
| 4,849,923 | 7/1989 | Samudrala et al. | 364/748 |

Primary Examiner—David H. Malzahn
Attorney, Agent, or Firm—Thomas E. Tyson

[57] ABSTRACT

A processor for performing floating point arithmetic operations is provided that includes a circuit that performs a first floating point arithmetic operation on a set of operands in a first cycle and a second floating point arithmetic operation on an operand and a result of the first floating point arithmetic operation during a second cycle. A control circuit is provided for, in a third cycle, transferring a result of the second floating operation to the first floating point circuit for a first floating point operation in a next successive cycle while rounding the result of the second floating point operation.

8 Claims, 7 Drawing Sheets

FL PT DETAILED PIPELINE FLOW - NO DATA DEPENDENCY

| 1 | 2 | 3 | 4 |
|---|---|---|---|
| DECODE CYCLE | MULTIPLY CYCLE | ADD CYCLE | WRITE CYCLE |
| DECODE | MULTIPLY | ADD | ROUND |
| READ OPERAND | ADD ALIGNMENT | NORMALIZE | WRITE TO FPR |

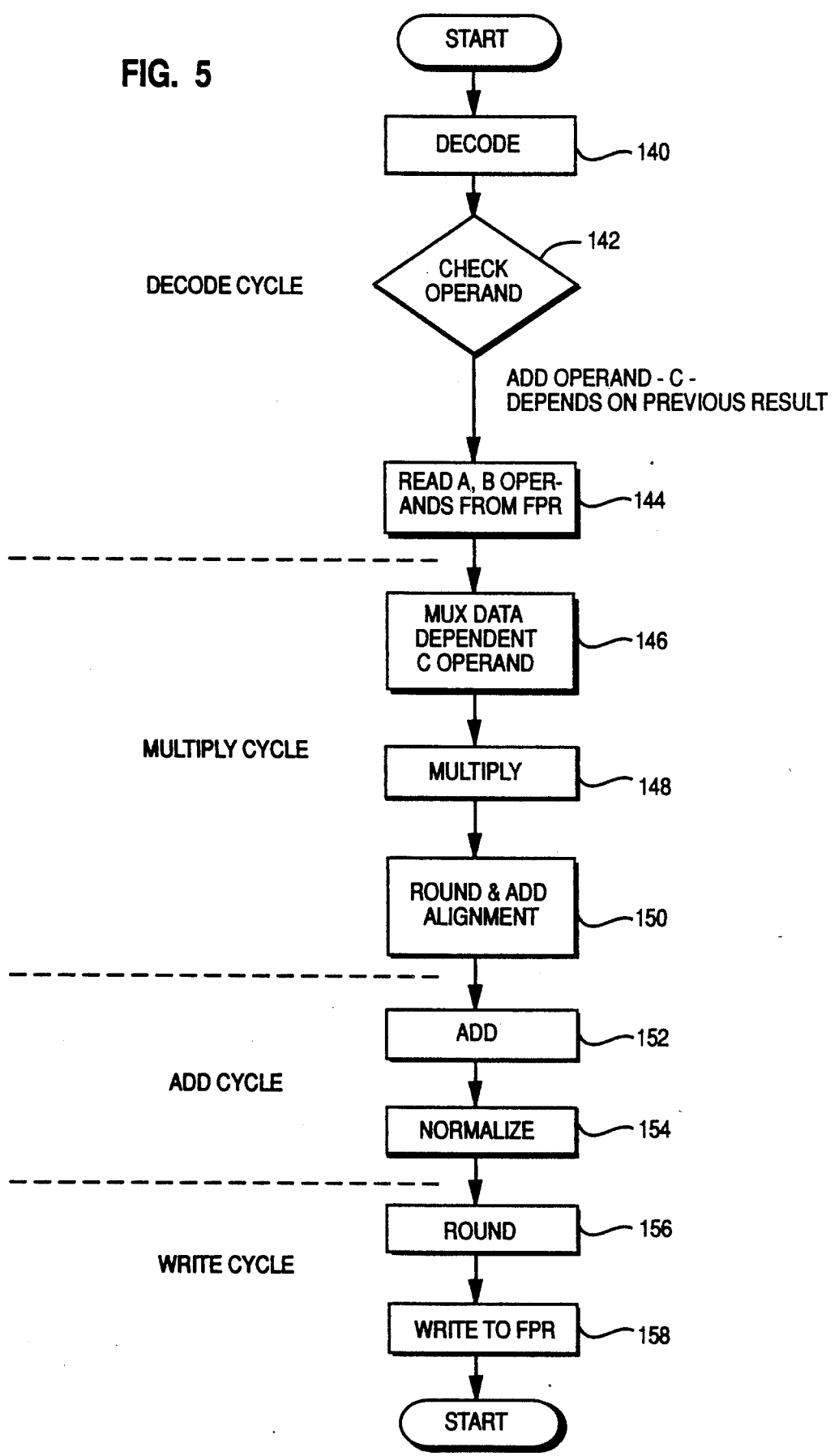

FLOATING POINT ARITHMETIC TWO CYCLE DATA FLOW

DESCRIPTION

1. Field of the Invention

This invention relates generally to data processing systems and more specifically to data processing systems providing floating point arithmetic operations.

2. Background Art

Traditionally floating point operations are performed in a sequential manner in data processing systems. In some data processing systems, a floating point operation is actually executed within the central processing unit in accordance with an algorithm provided by software. In other systems a dedicated floating point processor is provided. Both techniques require for the answer of a first operation to have been completed before a second operation is started. In modern pipeline processing, this requirement of waiting for the completion of a first operation before a second operation can commence may generate unnecessary delays.

It is an object of the present invention to provide a floating point processing unit that performs floating point arithmetic operations in a pipeline fashion, while determining data dependencies and performing data dependent floating point operations in a more efficient manner.

SUMMARY OF THE INVENTION

In accordance with the present invention an apparatus is provided for performing floating point arithmetic operations is provided that includes a circuit that performs a first floating point arithmetic operation on a set of operands in a first cycle and a second floating point arithmetic operation on an operand and a result of the first floating point arithmetic operation during a second cycle. A control circuit is provided for, in a third cycle, transferring a result of the second floating operation to the first floating point circuit for a first floating point operation in a next successive cycle while rounding the result of the second floating point operation.

In the preferred embodiment a floating point arithmetic unit is provided that performs both a multiply and addition operation. The control circuitry for the floating point arithmetic unit is able to detect when a second set of operands includes a result computed from a first set of operands in a sequence of floating point operations. When this second set of operands includes this result a data dependency is declared. The control circuit addresses the data dependency by providing the result of the first arithmetic operation before the rounding is actually complete. This rounding operation is used to provide a direct input to a floating point multiplier in the preferred embodiment. Also, the control circuit ensures that the answer from the first floating point operation is provided directly to the floating point circuitry in order to more quickly perform the second floating point operation.

BRIEF DESCRIPTION OF THE DRAWING

The novel features believed characteristic of the invention are set forth in the appended claims. The invention itself, however, as other features and advantages thereof, will be best understood by reference to the following description of the preferred embodiment, when read in conjunction with the accompanying figures, wherein:

FIG. 5 is a flow chart illustrating the operation of the control circuitry when a data dependency on the add operand exists;

BEST MODE FOR CARRYING OUT THE INVENTION

Figure 1:
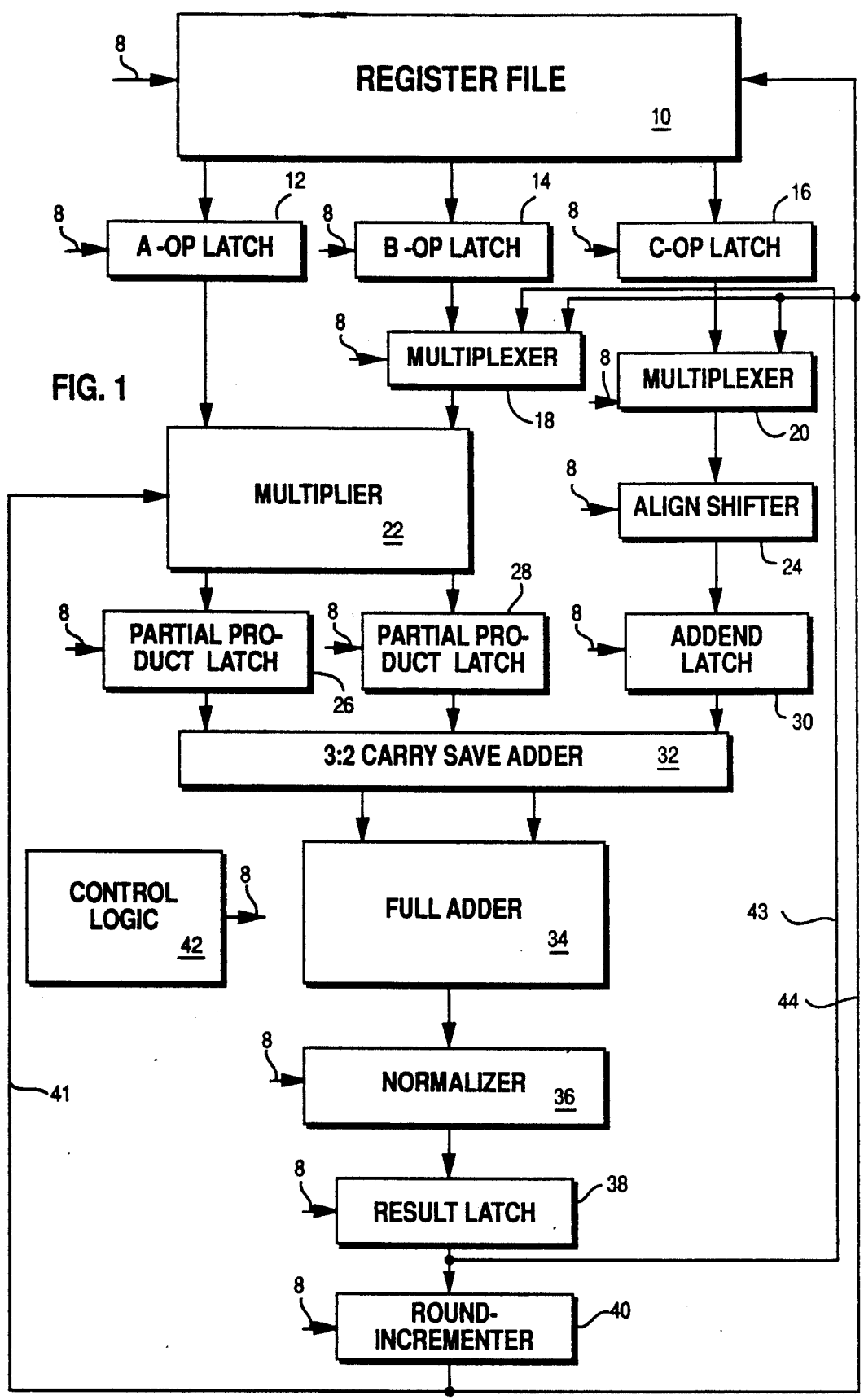
FIG. 1 is a block diagram of the floating point arithmetic unit.

This invention relates to a floating point arithmetic apparatus. In FIG. 1, a block diagram of the floating point processor is illustrated. A register file 10 is provided. In the preferred embodiment the register file stores 40 words. The register file 10 provides an output to an A operand latch 12, a B operand latch 14, and a C operand latch 16. In the preferred embodiment the A operation latch and B operation latch contain operands that are used in the multiplication portion of the floating point arithmetic operations. The C operation latch 16 contains the addition operand. The output of the A operation latch 12 is provided directly to multiplier 22. The output of the B operation latch 14 is provided through a multiplexer 18 to the multiplier 22. The output of the C operation latch 16 is provided to a multiplexer 20 and then to an align shifter 24. The purpose of the align shifter is to align the addition operand with the result of the multiplication performed in the multiplier circuit 22. The multiplier 22 provides an output to a first partial product latch 26 and a second partial product latch 28. The output of these latches 26 and 28 are provided to a three to two carry save adder 32. The align shifter 24 provides an output to the addend latch 30, which also provides an output to the three to two carry save adder 32. The carry save adder 32 provides two outputs to the full adder 34. The output of the full adder 34 is normalized in the normalizing circuit 36. Result latch 38 stores the result of the normalization operation. The data in the result latch is then rounded in the rounding circuitry 40 and in normal operation, provided back to the register file 10.

The control circuitry 42 includes a control line 8 which is, in fact, a set of control lines that control the different elements of the floating point processor shown in FIG. 1. One of the functions of the control circuitry 42 is to perform the addition of the exponents for the multiplication operation in the multiplier 22. This information is used by the align shifter 24 to properly align the addition operand. Also, a function of the control circuitry 42 is to determine when a data dependency exists. A data dependency is defined when the floating point operation to be performed includes an operand that is a result of a previous floating point operation. Under normal operation, the result of the previous floating point operation would be stored in the register file. Since the control circuitry 42 can detect data dependencies, the capability is provided to take the result from the rounding circuit 40 and provide it directly to one of two multiplexers 18 or 20. In this manner the unrounded result operation from latch 38 that is an operand for the multiplication or the rounded result that is an operand for the addition operation in a subsequent floating point operation, can be provided directly to the arithmetic circuitry without having to pass through the register file 10 and one of the latches 14 or 16. Additionally, the control circuitry 42 provides the capability for the rounding circuit 40 to provide an input 41 to a multiplier to indicate whether or not a round operation is needed.

Figures 2, 6:
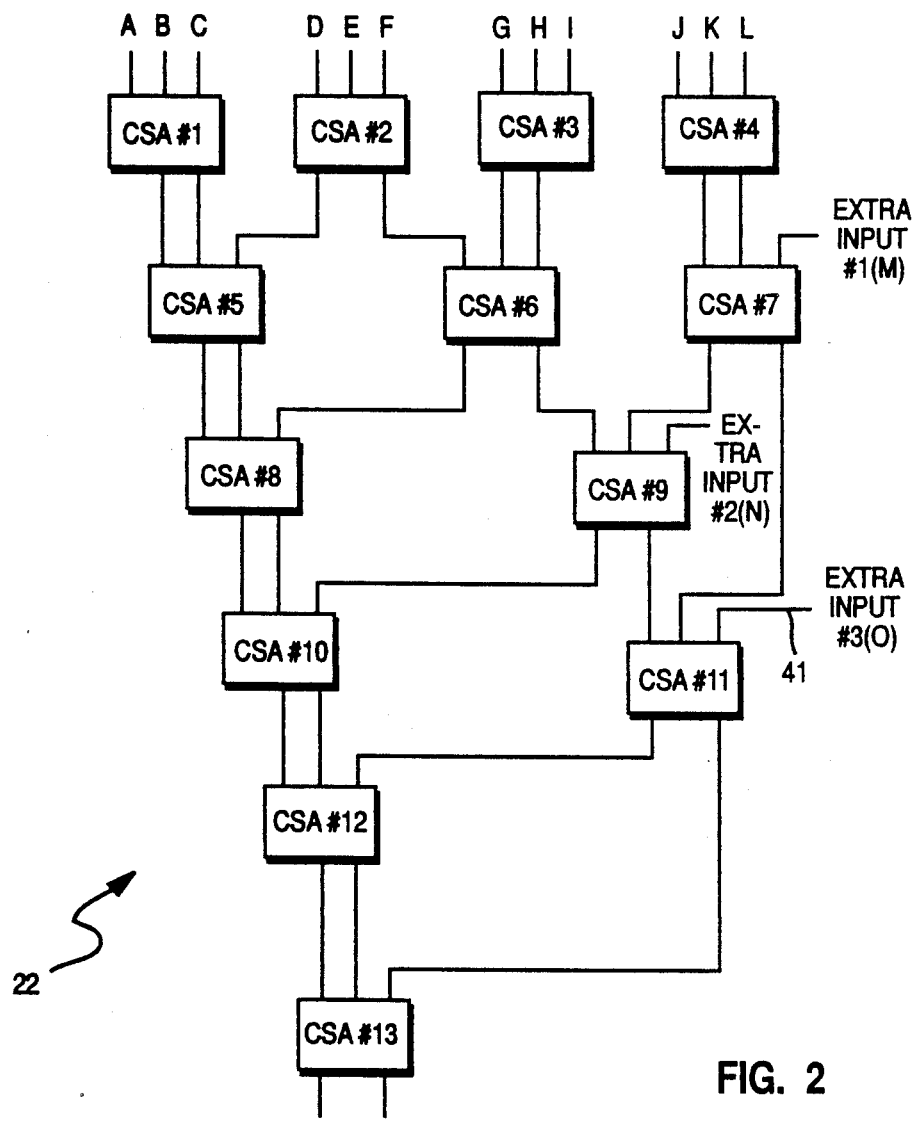
FIG. 2 is a block diagram of the multiplier circuit.
FIG. 6 is a timing diagram illustrating the pipeline operation of the floating point arithmetic unit when no data dependency exists.

FIG. 2 is an illustration of a carry save adder tree that is included in the multiplier circuit 22 of FIG. 1. Note that line 41 provides an input to the carry save adder CSA#11. This input is used to indicate if the previously computed result was rounded upward. If so, the one is added in a manner disclosed. Because of the propagation delay through the tree, the rounding can be added in a timely manner.

Figure 3:
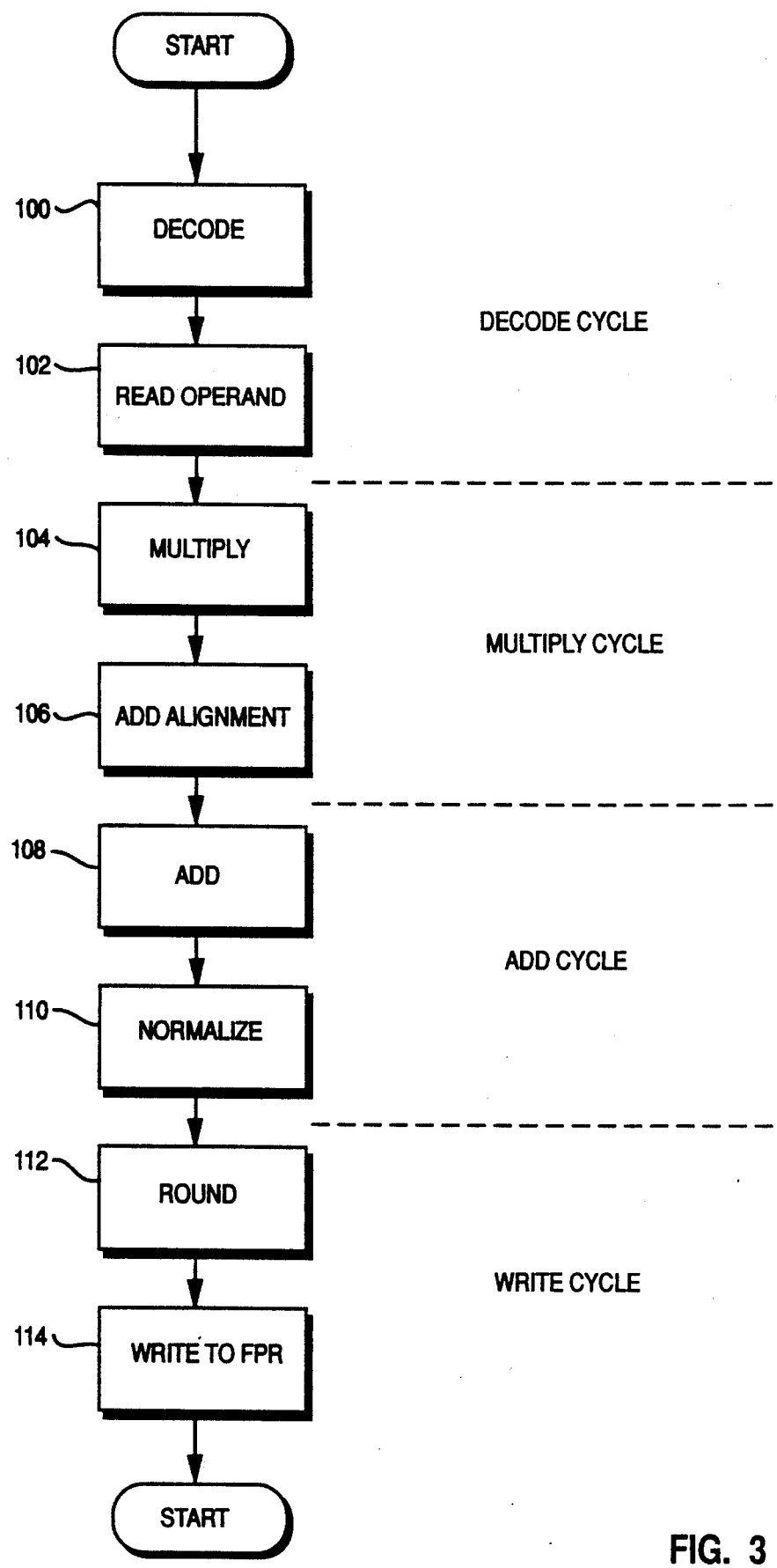
FIG. 3 is a flow chart illustrating the operation of the control circuitry when operating without a data dependency.

FIG. 3 is a flow chart illustrating the operation of the control circuitry 42 when no data dependency has occurred. In step 100 the floating point instruction is decoded. In step 102 the operands are read from the register file 10. Step 100 and step 102 make up what is termed the decode cycle. Then in step 104 the multiplication occurs together with the add alignment in step 106. In practice the multiplication and add alignment steps 104 and 106 respectively overlap. These two steps 104 and 106 are termed the multiply cycle. In step 108 the add operation is performed. Then in step 110 the normalization operation is performed. Steps 108 and 110 are referred to as the add cycle. In step 112 the result of the normalization cycle is rounded. Then in step 114 the rounded result in written into the floating point register file 10.

Figure 4:
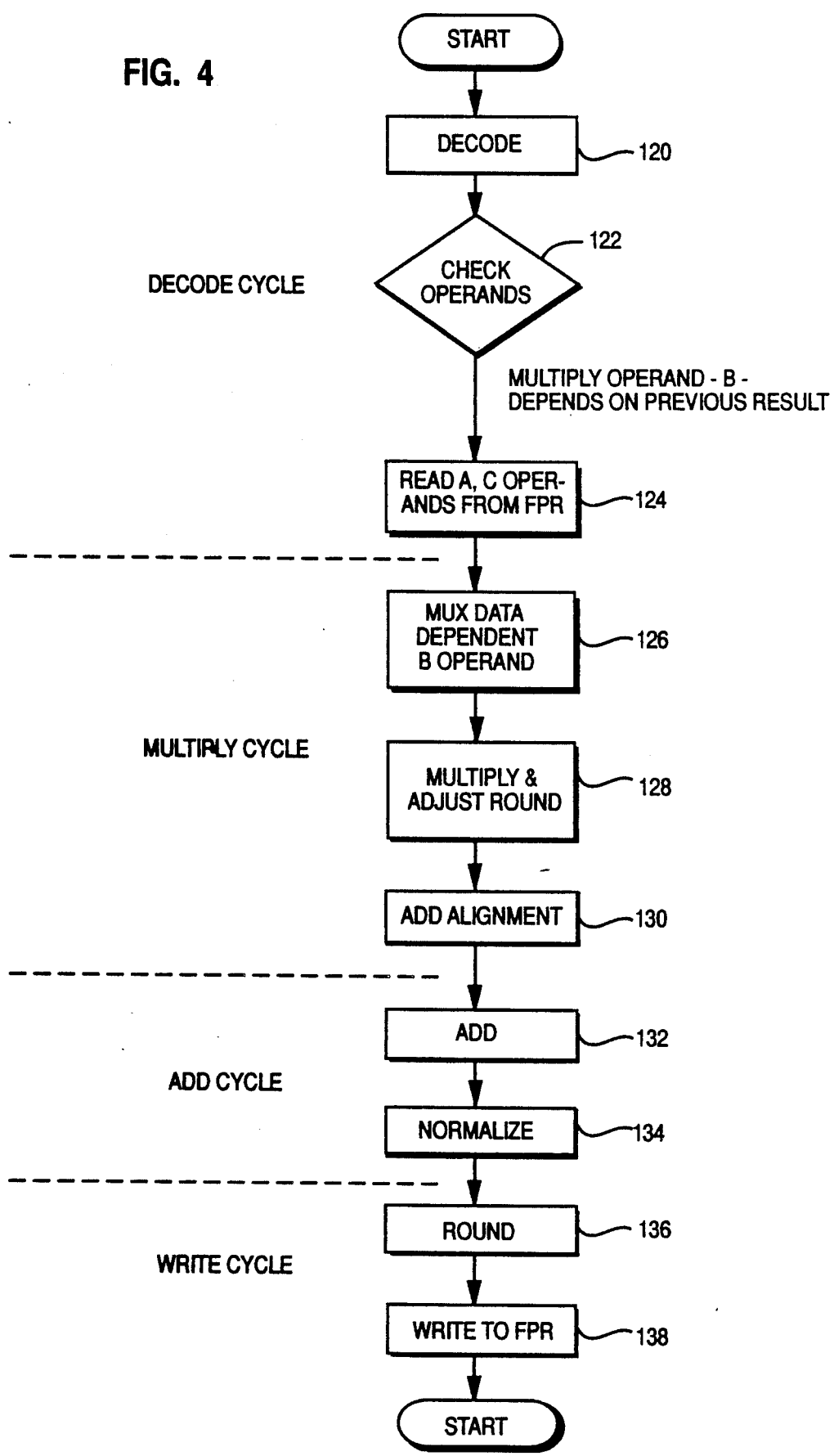
FIG. 4 is a flow chart illustrating the operation of the control circuitry when a data dependency that exists on one of the multiply operands occurs.

In FIG. 4 the control flow for a arithmetic operation where a data dependency on a multiply operand exists is shown. During the decode cycle, in step 120 the instruction is initially decoded. In step 122 the operands for the instruction are checked to determine if in fact there is a data dependency. In this example the operand B is a dependent operand (i.e., this B operand is actually the unrounded result of a previous floating point operation). In step 124 the A and C operands are loaded from the floating point register file 10. In step 126 the multiplexer 18 loads the B operand into the multiplier 22 and the multiply operation is performed in step 128. In step 128 the rounding adjustment from the round circuit 40 is provided on line 41 as previously discussed. Also simultaneously with the operation of the multiplier 22, the align shifter shifts the addition operand in step 130. In step 132 the add is performed and in step 134 the normalization is performed. As before the rounding is performed in step 136 and finally the result is written to the floating point register file 10 in step 138.

FIG. 5 illustrates the control flow for a floating point operation where a data dependency exists on an add operand. In step 140 the instruction is decoded and in step 142 the operands are checked. In this example the C operand is actually a previous floating point operation result. Therefore, in step 144 the A and B operands are loaded from the floating point register file 10. In step 146 the multiplexer 20 takes the C operand from the round circuit 40. The multiplication is performed in step 142 and the addition alignment shifting is performed in step 150. Since the add alignment is relatively quick, it is performed after completion of the round operation. In step 152 the add operation is performed and in step 154 the normalization of the result of the add is performed. This normalized result is rounded in step 156 and written to the floating point register file 10 in step 158.

FIG. 6 is a simple timing diagram illustrating the pipeline flow of the floating point processor for a single instruction. It should be understood that since this is a pipeline operation the second instruction will start its decode cycle at cycle 2. Likewise a third instruction would start its decode cycle in cycle 3 as shown in FIG. 6.

Figure 7:
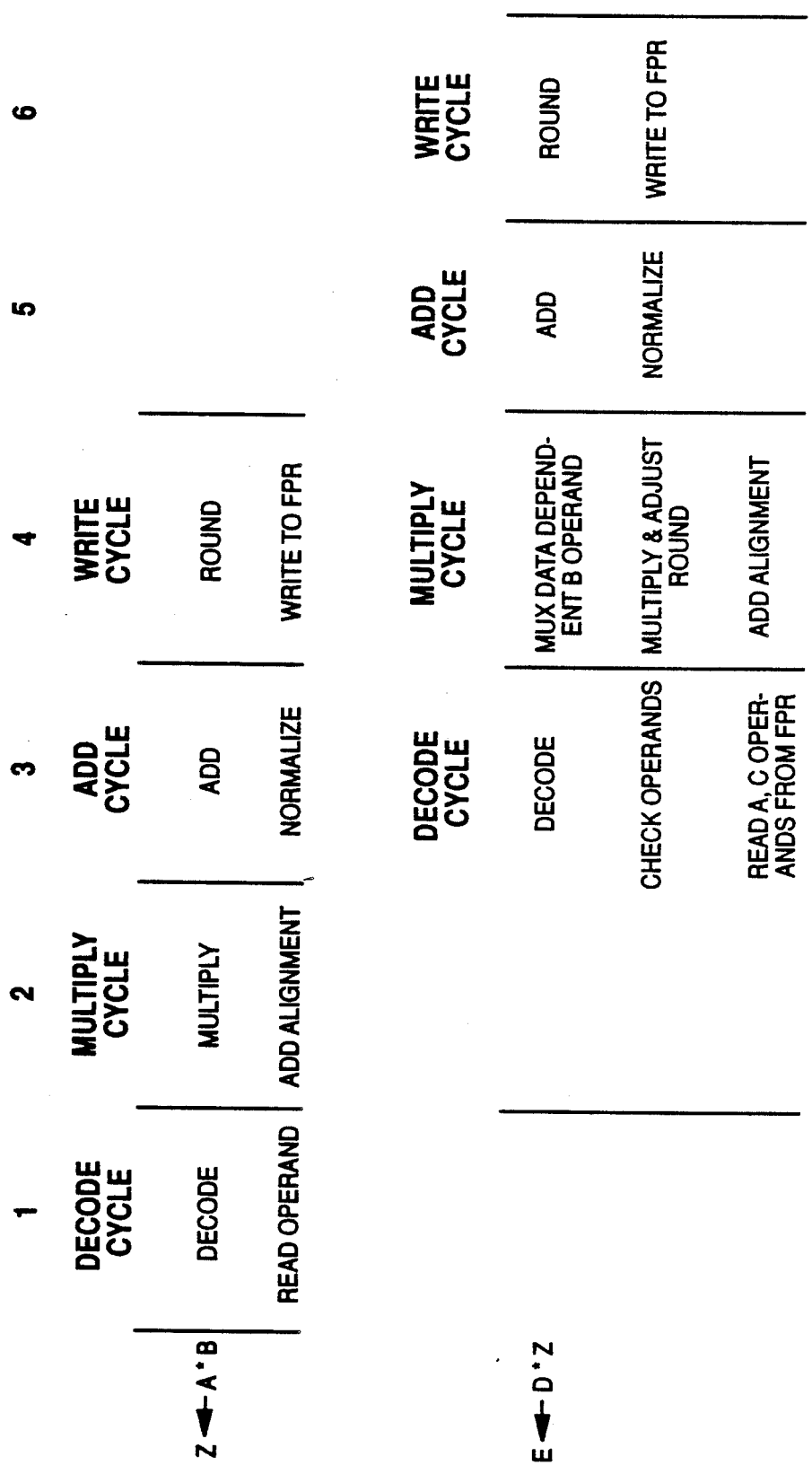
FIG. 7 is a timing diagram illustrating the pipeline operation of the floating point arithmetic unit when a data dependency of a multiplication operand exists.

FIG. 7 is a timing diagram illustrating the pipeline flow for the condition where a multiplication operand dependency exists. Note that during cycle 2 the decode operation actually exists for cycles 2 and 3. Then in cycle 4 the multiplexing of the data dependent operand is performed. The coincides with the early operation in cycle 4 that includes the rounding of the result.

Figure 8:
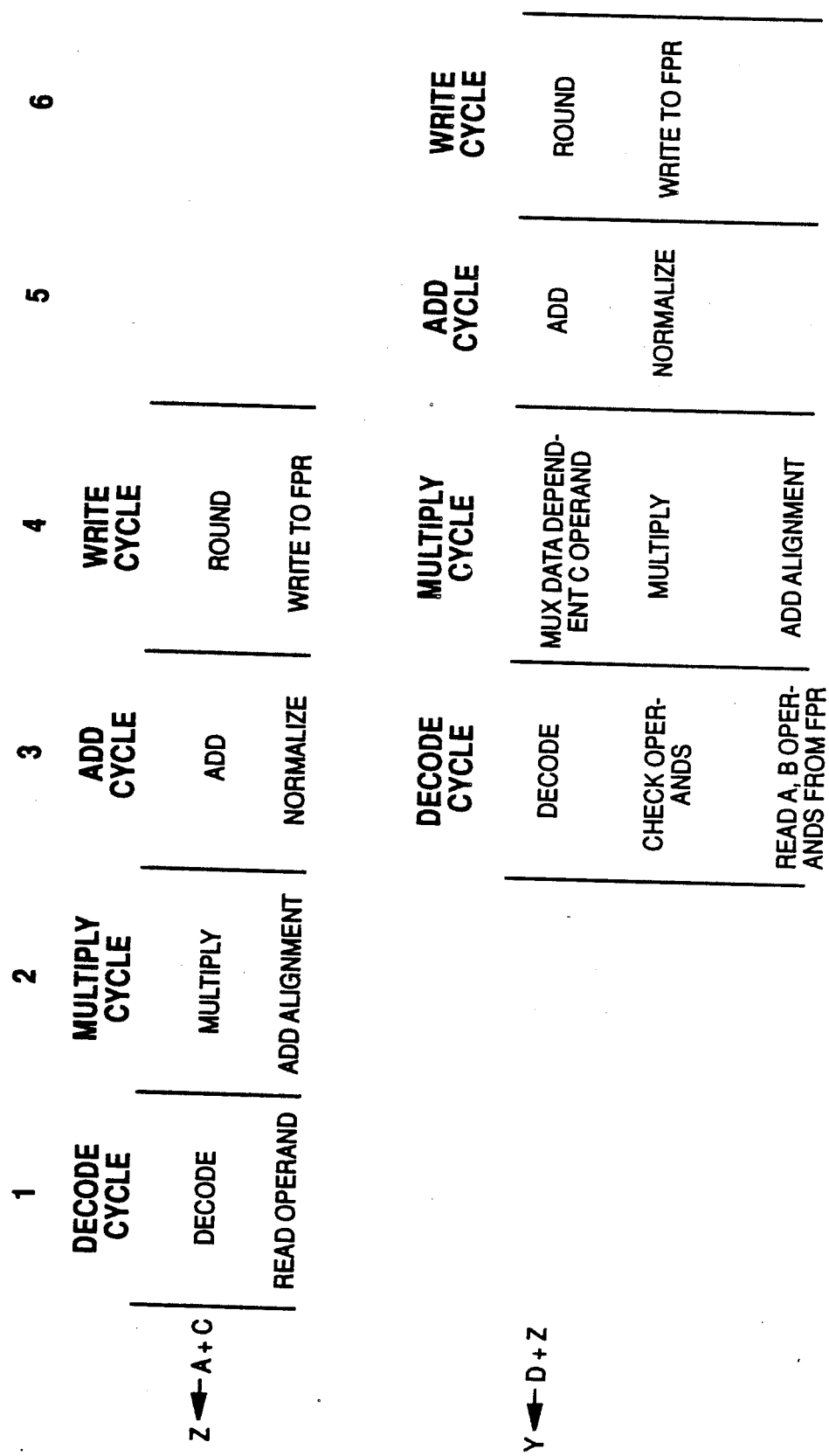
FIG. 8 is a timing diagram illustrating the pipeline operation of the floating point arithmetic unit when a data dependency of the addition operand exists.

FIG. 8 is a timing diagram illustrating the pipeline flow for a floating point operation wherein the add operand is dependent upon a previous operation. Again, in cycle 2 the decode operation for the second instruction takes two cycles (cycles 2 and 3). The multiply cycle in the second instruction overlaps with the write cycle in the first instruction (cycle 4) so that the result of the round operation can be multiplexed into the C operand for the add alignment operation.

Although the invention has been described with reference to this specific embodiment, the description is not meant to be construed in a limiting sense. Various modifications of the disclosed embodiment, as well as other embodiments of the invention, will become apparent to those persons skilled in the art upon reference to the description of this invention. It is, therefore, contemplated that the appended claims will cover any such modifications or embodiments that may fall within the true scope of the invention.

We claim:

1. An apparatus for performing floating point arithmetic operations, said apparatus comprising:
   means for performing a first floating point arithmetic operation on a set of operands in a first cycle;
   means for performing a second floating point arithmetic operation on an operand and a result of said first floating point arithmetic operation in a second cycle;
   control and rounding means for providing, during a third cycle, a result of the second floating point operation to the first floating point performing means for a first floating point operation in a next successive cycle while rounding the result of the second floating point operation.

2. An apparatus according to claim 1 wherein said first floating point arithmetic operation is a multiply operation.

3. An apparatus according to claim 2 wherein said second floating point arithmetic operation is an add operation.

4. An apparatus according to claim 1 wherein said first floating point arithmetic operation means includes a combinational logic circuit and said control means includes means for providing a round signal to said combinational logic circuit if a round operation has occurred.

5. An apparatus according to claim 4 wherein said control means includes means for providing a second result to either the first or the second floating point operation means upon determining that either one of a next successive first or second floating point operation includes said second result as an operand.

6. An apparatus for performing two floating point arithmetic operations in a pipeline comprising:

means for storing a plurality of floating point operands;

means connected to said storing means for performing a first floating point arithmetic operation on first and second stored operands;

means connected to the storing means and said first floating point arithmetic operation means for performing a second floating point arithmetic operation on a third operand and a first result of the first floating point operation;

means for rounding a second result of the second floating point operation; and control means for determining when the second result is in a next successive floating point operation to be performed by either the first or the second floating point arithmetic operation means and for providing said second result to either the first or the second floating point arithmetic operation means while the second result is being rounded in the rounding means.

7. An apparatus according to claim 6 wherein said first floating point arithmetic operation is a multiply operation.

8. An apparatus according to claim 7 wherein said second floating point arithmetic operation is an add operation.

* * * * *